Patented Dec. 28, 1948

2,457,678

UNITED STATES PATENT OFFICE 2,457,678

RESISTOR AND METHOD OF MAKING

Joseph W. Jira, Newburgh Heights, Ohio, assignor to Continental Carbon, Inc., a corporation of Ohio No Drawing. Application July 13, 1944, Serial No. 544,819

7 Claims. (Cl. 201—76)

My invention relates in general to a vitreous enamel having a relatively low melting point and more particularly to a protective coating for metallic surfaces.

Although not limited thereto, my protective coating finds utility in coating metals through which current flows or metallic resistors, and specifically in coating metal film resistors which may comprise a metallic film of minute thickness deposited upon a non-conducting carrier. A metal film resistor upon which my vitreous enamel may be applied is disclosed in my United States Patent No. 2,281,843 issued May 5, 1942.

An object of my invention is to provide a vitreous enamel coating having the desirable characteristics imparted by a metallic oxide of low melting point, but with a high dielectric strength.

Another object of my invention is the provision of a non-alkaline, low melting point enamel which does not damage the film or metallic surface as the coating is applied thereto.

Another object of my invention is the provision of a protective coating for a metallic surface or film resistor possessing immunity to humidity and sodium chloride solution because of its very low porosity.

Another object of my invention is the provision of an enamel for protecting a metallic surface or film of minute thickness which is adjustable in its thermal coefficient of expansion.

Another object of my invention is the provision of a protective coating for a metallic surface or film resistor of atomic dimension which will not penetrate the metallic surface or film and loosen it from its carrier.

Another object of my invention is the provision of an enamel produced from a frit which is a three-way eutectic of a metallic oxide of low melting point, silica, and a flux.

Another object of my invention is an enamel frit containing materials which are essentially a low melting point lead oxide, boron oxide flux and silica which has a fusing point embraced in a range in the neighborhood of 950° F. to 1200° F.

Another object of my invention is the provision of enamel which is accurately reproduceable from batch to batch.

Other objects and a fuller understanding of my invention may be had from the following description and claims:

In the practice of my invention, I prepare a vitreous frit by mixing lead oxide, commonly known as yellow litharge, which is a metallic oxide of low melting temperature, boron oxide and silica in substantially their eutectic ratio. These three materials are mixed together and melted at a temperature in the neighborhood of 1500° F. It is to be understood that the use of the term lead oxide herein, implies the use of any compound or compounds which will decompose, or chemically react with another compound, to produce lead oxide or its equilavent as it is heated up in producing the resulting enamel melt, such, for example, as lead carbonate. By mixing the original materials in substantially their eutectic ratio, it is possible to produce a vitreous frit which has the lowest possible melting point for the combination of the materials.

The term boron oxide is used herein to describe the material used in making the eutectic frit, although the term boric anhydride is an equivalent name for this same material. Substantially the same eutectic material may also be prepared by using borax instead of boron oxide, or by using boric acid, which is a combination of water with the boric anhydride. Borax and boric acid will suffice as suitable materials for my invention because they will decompose under heat when producing the resulting enamel melt. The decomposition produces the equivalent of boron oxide plus a by-product which may be tolerated. Therefore, in this application, the term boron compound flux shall be considered generic to the following species; namely, boron oxide, borax and boric acid. It can be seen then, that boric anhydride, boron oxide, boric acid, or borax may be used to prepare a vitreous frit of low melting point. For some uses, there is an objection, however, to the use of borax as a substitute for boron oxide because of the alkaline by-products which are left after the frit is made. In other uses, the alkaline nature imparted to the vitreous frit by the use of borax is not detrimental, and may be even beneficial. This, however, is not the case for an enamel intended to be used upon a metallic resistor of microscopic dimensions. Therefore, when the enamel is to be used upon the thin metallic film resistor, I use the oxide in the original charge, and not a material which may decompose under heat or chemical action to provide the equivalent of the boron oxide.

The melted material of the three ingredients is quenched in cold water to cool, and is shattered into very small particles because of the quick cooling action of the water. These small granulated bits of vitreous frit will then be found to have a melting point in the neighborhood of substantially 950° F., which is substantially the eutectic melting temperature of the combination. The eutectic frit just described has high dielectric strength, substantially stable aging characteristics, and is non-porous.

Many vitreous enamels have a tendency to conduct an electric current when exposed to humid atmosphere. Therefore, only an enamel which is non-porous and of high dielectric value may be employed. A vitreous enamel displaying variations in adhesion, contraction or expansion over a period of time cannot be used in the coating for protective metallic film resistors, since this characteristic would appreciably change the initial resistance value of the unit. It is seen then, that the eutectic frit of my invention forms the basis of an enamel which provides a new and unique protective coating for metallic film resistors.

While not limited thereto, but only set forth for the purpose of an example, I find from experience that materials mixed in the following proportions, subject to the variations hereinafter discussed, may be used in making a satisfactory frit to be used as the basis for my enamel.

|  | Parts by weight |
|---|---|
| Lead oxide | 58 |
| Boron oxide | 5 |
| Silica | 12 |

When the above tabled ingredients are mixed in the manner hereinbefore set forth, fired at substantially 1500° F., and quenched in water to granulate, the resulting frit is found to have a melting point of substantially 950° F. However, variations of this specific formula may be made to fill specific needs, within a temperature range from substantially 950° F. to 1200° F. Inasmuch as the above tabled list of ingredients represents the eutectic ratio of the materials, the lowest melting temperature possible for the frit is in the neighborhood of substantially 950 F. Although it is understood that the tabled list of ingredients represent the ultimate of desirable characteristics in a frit to be used as an enamel base for an enamel to cover a thin metallic film resistor carried on a non-conductive carrier, many applications will be found for a frit and an enamel to cover electrical conductors and other metallic surfaces which will not require the high standards required for a thin metallic resistor film. Therefore, some variation from the eutectic ratio is permissible in specific cases, and may possibly vary from the eutectic temperature and eutectic ratio enough to provide a melting temperature as high as the substantially 1200° F. hereinbefore described as the upper temperature limit, it being understood that any deviation from the eutectic ratio implies a higher melting point than the eutectic melting point. The criteria which will determine the ratio relationship of the materials of the frit, is the melting temperature required and the physical properties required, such, for example, as the dielectric strength, non-porosity and stable aging characteristics.

After the frit is granulated in the cooling water bath, it is pulverized to a very fine mesh. To this finely ground eutectic frit is added potassium feldspar as an expansion corrector to correct the temperature coefficient of expansion of the finished enamel to substantially agree with the temperature coefficient of expansion of the carrier on which the enamel is to be placed. Potassium feldspar has the further property of reducing the fluidity of the finished enamel, and thus the larger the addition of potassium feldspar the more viscous is the resulting enamel. An enamel of higher viscosity than the eutectic frit is desirable in the coating of a metallic film resistor of microscopic thickness to prevent the enamel from penetrating or damaging the metallic film and loosening it from the carrier.

It has been found from experience, that the potassium feldspar should be added to the eutectic frit in the ratio of substantially 20 parts by weight of potassium feldspar and 80 parts by weight of eutectic frit to make a suitable enamel for the metallic film resistor when mounted upon a ceramic non-conductive carrier. The carrier controls the expansion characteristics of the metallic film, because the film is very thin and is tightly bound thereto. However, in using other carriers, and for coating other metallic surfaces than a thin metallic resistor film, it is found in some instances that the eutectic frit as hereinbefore described is satisfactory without the use of potassium feldspar, whereas, in other instances as much as 30 parts by weight of potassium feldspar must be added to 70 parts by weight of eutectic frit to obtain the correct thermal coefficient of expansion and the correct viscosity in the finished enamel. Therefore, when using potassium feldspar to correct for thermal coefficient of expansion it is possible to vary that ingredient from substantially 5 parts by weight of potassium feldspar and 95 parts by weight of eutectic frit, to substantially 30 parts by weight of potassium feldspar with 70 parts by weight of eutectic frit. The criteria which will determine the amount of potassium feldspar added is the melting temperature and the physical properties desired, such, for example as the thermal coefficient of expansion.

An opacifier such as cobalt aluminate may be added to the mixture of eutectic frit and potassium feldspar to render the finished enamel opaque and colored. Further, finely dispersed opacifiers have the property of somewhat decreasing the toughness of the enamel.

After pulverizing the frit to a fine mesh, adding the potassium feldspar and cobalt aluminate, the resulting mixture is milled with water until these ingredients are finely divided and make a medium viscosity paste of paint-like consistency. The enamel is now ready for use and is originally applied to the outside surface of the metallic surface or thin metallic resistor film in the form of a slip that may be applied thereto by spraying, dipping, or brushing it thereon, or by any other suitable means.

For making a satisfactory vitreous enamel slip to be applied to a metallic resistor film of very thin dimensions and carried by a non-conductive carrier, it is found when giving due consideration to the factors hereinbefore explained, that substantially the following proportions may be used:

|  | Parts by weight |
|---|---|
| Lead oxide | 58 |
| Boron oxide | 5 |
| Silica | 12 |
| Potassium feldspar | 20 |
| Cobalt aluminate | 5 |

When the above tabled ingredients are mixed in the manner hereinbefore set forth, an enamel slip of paint-like consistency is obtained which is easy to use and which is never alkaline. This enamel frit when dehydrated, as by drying in the air, will be found to have a fusion point in the neighborhood of substantially 1000° F. or less.

It is found, however, that the above listed proportions may be varied in their ratio with one another enough to permit the fusion temperature of the enamel to vary between 950° F. and 1050° F. without imposing any serious decrease in the enamel quality or desirous properties for use as a coating for metal film resistors. It is quite possible to vary any one or all of the constituents a small amount without causing the fusing temperature to rise beyond the stipulated 1050° F. maximum. In ordinary factory practice, a permissible variation may be substantially as follows for the frit:

| | Parts by weight |
|---|---|
| Lead oxide | 54–62 |
| Boron oxide | 4.5–5.5 |
| Silica | 11–13 |

In the finished enamel, the cobalt aluminate is usually added in substantially 5 parts by weight with 95 parts by weight of the combined frit and feldspar enamel, but is used mainly as an opacifier, and therefore may be varied through wide limits. However, 4.5–5.5 parts by weight of the opacifier with 95.5–94.5 parts by weight of enamel is the usual range used in my enamel. The potassium feldspar is added in varying amounts dependent upon conditions hereinbefore set forth, and may vary from substantially 5 parts by weight with 95 parts by weight of frit, to substantially 30 parts by weight with 70 parts by weight of frit.

To apply the protective coating enamel to metallic film resistor unit or other surfaces to be coated, the enamel slip is sprayed, dipped, or brushed on the surface to be protected. The enamel slip is then dehydrated as described. After dehydration, the units are fired at substantially 1000° F. for a period of 5 minutes to fuse the frit, the expansion corrector and the opacifier into a homogeneous mass having very desirable characteristics.

In addition to those characteristics inherent to the eutectic frit alone, the finished, fused protective coating for a metallic film resistor carried by a non-conductive carrier is found to have a very low penetration characteristic in regard to the surface with which it is in contact. That is to say, most vitreous enamels of low melting point have the tendency to be very fluid at the point of fusion. This characteristic is detrimental to the metallic film resistor since easy penetration causes a discontinuity of the metallic film and consequently creates a variation of resistance with voltage, better known as high voltage coefficient of resistance. The enamel of my invention for a metallic film resistor does not have this property of extreme fluidity at the fusion point and thus does not tend to penetrate the twin metallic film of the resistor. The surface of the unit coated with my enamel will be found to have good hardness characteristics although being sufficiently tough to stand hard usage. Unlike many vitreous enamels of low melting point, my protecting coat is not soft, easily chipped, cracked or abraded when rubbed together. Further, my enamel protective coating is adjusted to a thermal coefficient of expansion to correspond with the coefficient of expansion of the carrier on which it is used, thereby preventing crazing or spalling during alternate heating and cooling of the units either in the process of manufacture or in use, thereby preserving the hard, glossy, humidity and solution immune surface.

In the production of many enamels, although a laboratory perfection is reached, it is virtually impossible to reproduce the desired characteristics from time to time in new and separate batches. My invention, however, is accurately reproduceable. Being composed of very common ingredients, readily obtainable in standard purity, each batch will give precisely the same results as any preceding batch.

Another desirable feature of my vitreous enamel coating is the fact that its fusing temperature is far in excess of the operating temperature of the resistor under load so that the resistance is always maintained at a fixed value. The vitreous enamel coating is so impervious to outside atmospheric conditions that the resistance value is always stable and stays permanently fixed.

Although I have described my invention with a certain degree of particularity, it is understood that the present disclosure has been made only by way of example and that numerous changes may be resorted to without departing from the spirit and the scope of the invention as hereinafter claimed.

I claim as my invention:

1. A low porosity vitrified enamel protective coating for a metallic resistor film deposited upon a non-conductive carrier, the said coating comprising a layer of enamel slip fused on the metallic resistor film, the said enamel slip comprising in the range of 54–62 parts by weight of lead oxide; 4.5–5.5 parts by weight of boron oxide; 11–13 parts by weight of silica; 19–21 parts by weight of potassium feldspar; and 4.5–5.5 parts by weight of cobalt aluminate.

2. A vitrified enamel protective coating for a metallic film resistor including a frit made from materials which are essentially yellow litharge, boron oxide, and silica, said frit and materials being proportioned substantially as follows: yellow litharge—58 parts by weight; boron oxide—5 parts by weight; silica—12 parts by weight; said frit being adjusted in its thermal coefficient of expansion by the addition of potassium feldspar, the amount of potassium feldspar added being dependent upon the thermal coefficient of expansion of the surface to be coated and said amount being variable within substantially the range of 5 parts by weight to 30 parts by weight.

3. An enamel for the protection of metallic surfaces, the enamel comprising a fusion of a low melting point frit with a material to adjust the fluidity of the enamel and to adjust the thermal coefficient of expansion of the enamel to a desired value, the said frit comprising substantially the following ingredients: lead oxide—58 parts by weight; boron oxide—5 parts by weight; silicia—12 parts by weight; the said material to adjust the fluidity and thermal coefficient of expansion comprising essentially potassium feldspar, the fusion point of the enamel being substantially in the neighborhood of 950° F. to 1200° F.

4. An enamel comprising a mixture of a finely sub-divided frit with potassium feldspar and cobalt aluminate, the said frit comprising substantially lead oxide, boron oxide, and silica, the total ingredients being proportioned by weight substantially as follows: lead oxide—58 parts by weight; boron oxide—5 parts by weight; silica—12 parts by weight; potassium feldspar—20 parts by weight; cobalt aluminate—5 parts by weight.

5. A resistor comprising, in combination, a non-conductive carrier, a resistance element composed of a thin film of metal on the non-conductive carrier, and a protective coating for the resistance element, said protective coating comprising a layer of fused frit adjusted in its thermal coefficient of expansion by a refractory material of low thermal expansion coefficient of the class consisting of potassium feldspar, said frit comprising essentially lead oxide in the neighborhood of 58 parts by weight, boron oxide in the neighborhood of 5 parts by weight, and silica in the neighborhood of 12 parts by weight, the potassium feldspar comprising an independent dispersed phase in the frit and being included in amount from 5 parts by weight to 30 parts by weight, the amount of the potassium feldspar being determined by the thermal coefficient of expansion of the said non-conductive carrier, the coefficient of expansion being reduced by increasing the proportion of the potassium feldspar.

6. A low porosity vitrified enamel protective coating for a thin resistor film externally deposited upon a non-conductive carrier, the said protective coating comprising a fused layer of frit adjusted in its thermal coefficient of expansion by potassium feldspar, the said frit comprising essentially lead oxide in the neighborhood of 58 parts by weight, boron oxide in the neighborhood of 5 parts by weight, and silica in the neighborhood of 12 parts by weight, the feldspar being added in sufficient amount to correlate the expansion coefficient of the enamel with the said non-conductive carrier.

7. The method of making an electrical resistor which comprises applying to a resistance element composed of a thin film of metal on a non-conductive carrier an enamel slip, said enamel slip containing a frit comprising between 54 to 62 parts by weight of lead oxide; between 4.5 to 5.5 parts by weight of boron oxide; between 11 to 13 parts by weight of silica, and a refractory material of low thermal expansion coefficient comprising an independently dispersed phase in the slip with the frit and being included in amount from 5 parts by weight of the refractory with 95 parts by weight of frit, to 30 parts by weight of the refractory with 70 parts by weight of frit, the amount of the refractory being determined by the thermal coefficient of expansion of the said non-conductive carrier, the coefficient of expansion being reduced by increasing the proportion of the refractory, and drying and firing the slip at a temperature within a range from 950° C. to 1200° C.

JOSEPH W. JIRA.

REFERENCES CITED

The following references are of record in the file of this patent:

UNITED STATES PATENTS

| Number | Name | Date |
|---|---|---|
| 96,634 | Thomas | Nov. 9, 1869 |
| 494,526 | Forster | Mar. 28, 1893 |
| 2,079,339 | Shively | May 4, 1937 |
| 2,225,659 | Remington et al. | Dec. 24, 1940 |
| 2,283,090 | Power | May 12, 1942 |
| 2,301,741 | Morris | Nov. 10, 1942 |
| 2,351,252 | Deyrup | June 13, 1944 |
| 2,394,591 | Bricker | Feb. 12, 1946 |

FOREIGN PATENTS

| Number | Country | Date |
|---|---|---|
| 4,139 | Great Britain | 1881 |
| 15,129 | Great Britain | 1899 |